United States Patent [19]
Hirosawa et al.

[11] Patent Number: 4,975,836
[45] Date of Patent: Dec. 4, 1990

[54] VIRTUAL COMPUTER SYSTEM

[75] Inventors: Toshio Hirosawa, Machida; Junichi Kurihara, Hachioji; Shigemi Okumura, Kiyose; Tetsuzou Uehara, Nishitama; Tsutomu Itoh, Hachioji, all of Japan

[73] Assignee: Hitachi, Ltd., Tokyo, Japan

[21] Appl. No.: 809,182

[22] Filed: Dec. 16, 1985

[30] Foreign Application Priority Data

Dec. 19, 1984 [JP] Japan ................. 59-266457
Mar. 8, 1985 [JP] Japan ................. 60-44774
Mar. 12, 1985 [JP] Japan ................. 60-47553

[51] Int. Cl.$^5$ .............................. G06F 9/46
[52] U.S. Cl. .................. 364/200; 364/281.3; 364/280.8; 364/228.2; 364/245.5; 364/247.0
[58] Field of Search ... 364/200 MS File, 900 MS File

[56] References Cited

U.S. PATENT DOCUMENTS

| | | | |
|---|---|---|---|
| 4,253,142 | 2/1984 | Bavoux et al. | 364/200 |
| 4,347,565 | 8/1982 | Kaneda et al. | 364/200 |
| 4,400,769 | 8/1983 | Kaneda et al. | 364/200 |
| 4,456,954 | 6/1984 | Bullions, III et al. | 364/200 |
| 4,459,661 | 7/1984 | Kaneda et al. | 364/200 |
| 4,475,156 | 10/1984 | Federico et al. | 364/300 |
| 4,554,626 | 11/1985 | Katz et al. | 364/200 |
| 4,660,144 | 4/1987 | Walsh | 364/200 |
| 4,691,278 | 9/1987 | Iwata | 364/200 |
| 4,779,188 | 10/1988 | Gum et al. | 364/200 |

FOREIGN PATENT DOCUMENTS 0171475 2/1986 European Pat. Off. .

OTHER PUBLICATIONS

Blum, A., "Multiple General Purpose Register Sets Embedded in Processor Chips", IBM Technical Disclosure Bulletin, vol. 24, No. 7B (Dec., 1981), pp. 3896–3897.

Stritter, E. et al., "A Microprocessor Architecture for a Changing World: The Motorola 68000", Computer, vol. 12, pp. 43–51 (1979).

Primary Examiner—Gareth D. Shaw
Assistant Examiner—M. Napiorkowski
Attorney, Agent, or Firm—Antonelli, Terry, Stout & Kraus

[57] ABSTRACT

A virtual machine system has a processor operating as a base machine which includes a plurality of groups of registers, such as data registers, address registers and instruction address registers which are selected according to identification data identifying individual virtual machines. A respective group of registers is allotted to each virtual machine and to the virtual machine monitor in the system. A status register file is provided to effect selective access to a respective one of a plurality of status registers in the system in accordance with a virtual machine number. An interrupt processing portion is provided comparing the value of an interrupt mask level of the status word of a corresponding virtual machine with an externally generated interrupt level to control interrupt processing.

16 Claims, 8 Drawing Sheets

| BIT | | SELECTION OPERATION OF REG GROUPS 55, 56, 59 |
|---|---|---|
| H | V | |
| 0 | 0 | SELECT #0 |
| 0 | 1 | SELECT #0~#15 BASED UPON A VM NUMBER FROM VMID REG 105 |
| 1 | 0 | DON'T CARE |
| 1 | 1 | SELECT #0~#15 BASED UPON A VM NUMBER FROM S-REG 37 |

| BIT | | SELECTION OPERATION OF REG GROUPS 55, 56, 59 |
|---|---|---|
| H | V | |
| 0 | 0 | SELECT #0 |
| 0 | 1 | SELECT #0~#15 BASED UPON A VM NUMBER FROM VMID REG 105 |
| 1 | 0 | DON'T CARE |
| 1 | 1 | SELECT #0~#15 BASED UPON A VM NUMBER FROM S-REG 37 |

VIRTUAL COMPUTER SYSTEM

BACKGROUND OF THE INVENTION

This invention relates generally to a virtual computer system, and more particularly to the allotment of bare computer resources to virtual computers.

Figure 1:
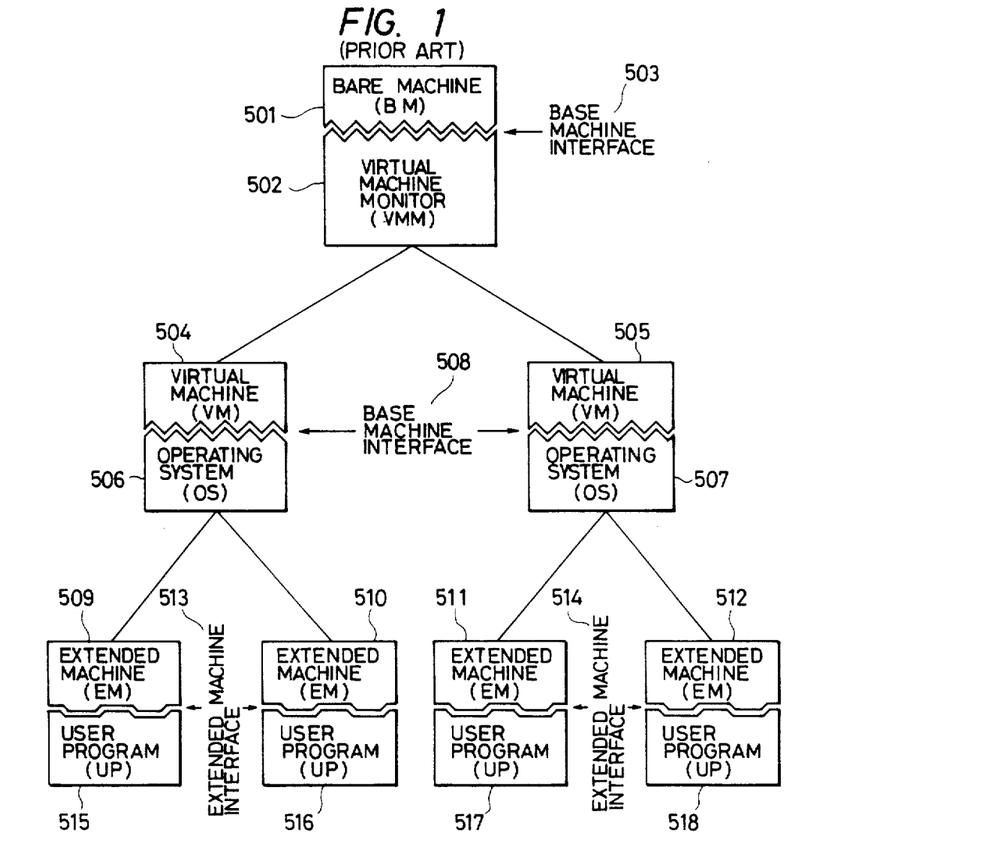
FIG. 1 is a block diagram showing the concept of a virtual computer system.

A virtual machine system (hereinafter referred to as "VMS") makes it possible to run apparently simultaneously a plurality of operating systems (hereinafter referred to as "OS") 506, 507 on one bare machine (hereinafter referred to as "BM") as shown in the conceptual view of FIG. 1 of the accompanying drawings. To accomplish the system, a specific control program (such as a virtual machine monitor which will be hereinafter referred to as "VMM") 502 is prepared instead of directly disposing a base machine interface between BM 501 and each OS 506, 507, and this control program operates directly under BM 501 through the base machine interface 503 and provides a base machine interface 508 equivalent to the base machine interface 503 to each OS 506, 507. The machine which is conceptually produced when VMM 502 thus produces the base machine interface 508 is referred to as a virtual machine (hereinafter referred to as "VM"). In FIG. 1, VM 504 for which OS 506 operates and VM 505 for which OS 507 operates are shown, but an arbitrary number of VMs can of course be provided. VM 504 and VM 505 are changed over under the control of VMM 502 so that OS 506 and OS 507 operate apparently simultaneously.

OS 506 and OS 507 provide extended machine interfaces 513 and 514 for user programs (hereinafter referred to as "UP") 515, 516, 517 and 518, and extended machines (hereinafter referred to as "EM") 509–512 are formed. Each of EM 509 through 512 has the function of executing the processing in accordance with a processing request for a certain bulk function from a UP associated therewith (which request is called a supervisor call or a function call) inside its OS and the function of a base machine interface. OS 506 and OS 507 are different from each other, therefore, EMs belonging to the respective OSs (e.g., EMs 509 and 511) have mutually different functions.

As described above, the VMS enables a plurality of mutually different OSs to run apparently simultaneously on a single BM. As a result, the following effects can be expected.

(1) Debugging and test of a newly developed system can be made without stopping the service of the system which is under operation.

(2) Since a plurality of mutually different OSs can be operated by a single BM, the utilization rate of hardware resources can be improved.

(3) A computer system having a different architecture or system configuration from the BM can be virtually formed, so that the control program of a new machine or system can be carried out where hardware does not practically exist.

Therefore, a specific control program VMM 502 exists in order to accomplish VMS. To operate VMs 504, 505 highly efficiently, VMM 502 divides the hardware resources of BM 501 time-wise and spatially by use of multi-programming techniques and allots them to each VM 504, 505. The instruction for operating the hardware resources is dealt with as a so-called "privileged instruction" in order to ensure the overall completeness of the system in VMS, and can be executed only in an operation mode called a "privileged mode".

Upon detecting that such a privileged instruction is generated from OS 506 or 507, VMM 502 interprets and executes the instruction by itself, and after completion of the instruction, returns the control to the operating OS. This processing is necessary in order to use in common the resources of BM 501 between VMs, and this processing time is an overhead inherent to the VMS. Since the common use of a main memory is realized by the technique of the virtual memory system, the time necessary for the address conversion also becomes an overhead. The primary overheads inherent to the VMS can be broadly classified as follows.

(1) An overhead by the simulation of the privileged instruction.

(2) An overhead by simulation of interruption.

(3) An overhead by address conversion to support the virtual memory function.

(4) An overhead for change-over service processing (dispatch processing) between VMs.

Attempts to reduce the overhead (3) described above are disclosed in Japanese Patent Laid-Open Nos. 23146/1975 and 212680/1982. One of the prior art techniques to reduce the overheads (1) and (2) is described in Japanese Patent Laid-Open No. 53749/1980. This prior art technique prepares operation register groups to be used by OSs on a VM separated from operation register groups to be used by the VMM inside the BM in order to reduce the overhead resulting from the retreat/recovery processing of the contents of the operation register groups involved in the processing of (1) and (2). However, the operation register group for VM is a single group used in common between VMs. Therefore, the overhead is left unreduced in connection with the processing (4) because the slave/restore processing of the content of the operation register group is necessary.

When an instruction which updates or refers to the content of a status register is issued from a program operating under each VM in the processing (1) described above, VMM executes substitution processing for the bare hardware operation inside a region for the status register of each VM formed in a control block for each VM by the VMM in a main memory. (This is called "simulation processing of the preferential instruction".) This simulation processing remains as the overhead.

Furthermore, when an interruption from an external unit occurs in the processing (2) described above the VMM immediately receives the interruption. Therefore, the interruption mask level number to the status register is set to the lowest order (0 value). Next, the VMM compares the interruption mask level number of the VM, which is disposed in the region of the status register of the VM formed in the control block of VM, with the interruption level number thus generated, in the same way as above (1). If the VM is found to be able to accept the interruption as a result of comparison, the simulation processing of the interruption operation is effected for that VM. If the VM is found to be unable to accept the interruption, an interruption information list is added to the control block of that VM. These processings are all executed by the VMM and remain as the overhead.

Conventionally, VMS has been examined in the field of large scale general-purpose computers or main frame processors. It is believed that the inventions disclosed in the afore-mentioned prior art references are also directed to large scale general-purpose computers. On the other hand, micro-computer technique has made a remarkable progress in recent years due to the remarkable progress in LSI technique with the consequence that so-called "personal computers" (hereinafter referred to as "PC") consisting of the combination of a micro-computer with peripheral units have come to gain wide applications. A large number of application programs have been developed for a variety of PCs, and the desire has occurred for the users of micro-computers to use attractive application programs that have been developed for other models. However, these application programs are prepared so as to operate under specific operating systems (OS). Particularly in the case of PCs in general, the applicability of an application program is generally limited to the microcomputer for which it is developed. Therefore, in order for use of such an application program to other PCs having different OSs, it is generally necessary to replace the OS or to change the OS-dependent portion of the application program in order to use the application program for PCs having different OSs, and they are extremely in inconvenient. As means for solving the problem, the employment of a VMS which enables a plurality of OSs to operate on a single bare machine would be extremely effective because the OS for a PC is by far smaller than that of mainframe OSs.

At present, however, PCs are not equipped with means for reducing the overheads of a VMM, as described above. An improved method of minimizing these overheads is indispensable for the application of the VMS for a PC. A typical micro-computer architecture used at present is disclosed in the references below, for example:

"A Microprocessor for a Changing World: the Motorola 6800" Computer, Vol. 12, pp. 43–51 (1979–2).

"iAPX 86 Family Users Manual", Intel Japan: Document No. 205885J

SUMMARY OF THE INVENTION

It is an object of the present invention to provide means for reducing the processing overheads by the intervention of a VMM, particularly the overheads of the slave/restore processing of register groups including operational registers at the time of change-over service processing between VMs described already.

It is another object of the present invention to provide means for reducing the overheads at the time of simulation processing of a VMM when an instruction to update or refer to the content of a status register is issued from a program operating under each VM.

It is still another object of the present invention to provide means for reducing the overheads due to the simulation processing of the interruption processing of the VMM described already when an interruption from an external unit occurs.

In accordance with the present invention, a processor as a bare machine of a VMS is equipped with a plurality of groups of registers (operational registers such as data registers and address registers, instruction address registers, etc.) which are selected, one group at a time, register selection means for selecting these register groups, and means for holding data identifying individual VMs (e.g., a VM identification number). The register selection means selects one group of registers in response to the VM identification data and lets the VM use the selected group of registers. Therefore, one group of registers are exclusively allotted to each VM. One group of registers are also allotted to VMM by considering it as one of the VMs. Therefore, the operation which withdraws the data in the register group for the operating VM into a main memory and reads out data for a VM to be newly executed from the main memory becomes unnecessary even when VMs are changed over.

In the later-appearing embodiments of the invention, the VMM can designate the register group allotted to an arbitrary VM, and can make access to the register group.

For the second object of the present invention, a status register file is disposed so that access is made selectively to each status register in accordance with the VM number. Each status register is alloted to a respective virtual machine (VM) or to a bare machine (BM), and holds a status word used for the control of execution. A reference or updating instruction to the status register, which is issued from each VM, is executed as the reference or updating of the corresponding status register in the status register file. The content of the updated status register, except for the supervisor mode bit and the interruption mask, is reflected automatically by a reflection circuit on a common status register used for the control of the machine, so long as the original function of the control program (VMM) is not adversely affected, and a predetermined value is set to a field for which updating is suspended. Accordingly, the updating of the status register at the time of switching of VMs, or the updating and reference to the status register, depending on the requirements of the operating VM, can be speeded up.

To accomplish the third object of the present invention, the processor or the bare machine is equipped with means for comparing the value of an interruption mask level of the status word of a corresponding VM with an external interruption level value generated, and means for delivering an interruption number and an interruption start signal to an instruction execution control unit inside a micro-processor if the interruption operation is found possible as a result of the comparison, and for delivering an interruption suspension signal to the instruction execution control unit in the microprocessor if an interruption inhibition condition is found as a result of the comparison. Since the judgement of the possibility of interruption resulting from the occurrence of the external interruption is made by hardware according to this arrangement, the overheads of the simulation processing that is effected by the VMM can be reduced.

DESCRIPTION OF THE PREFERRED EMBODIMENTS

Figure 2:
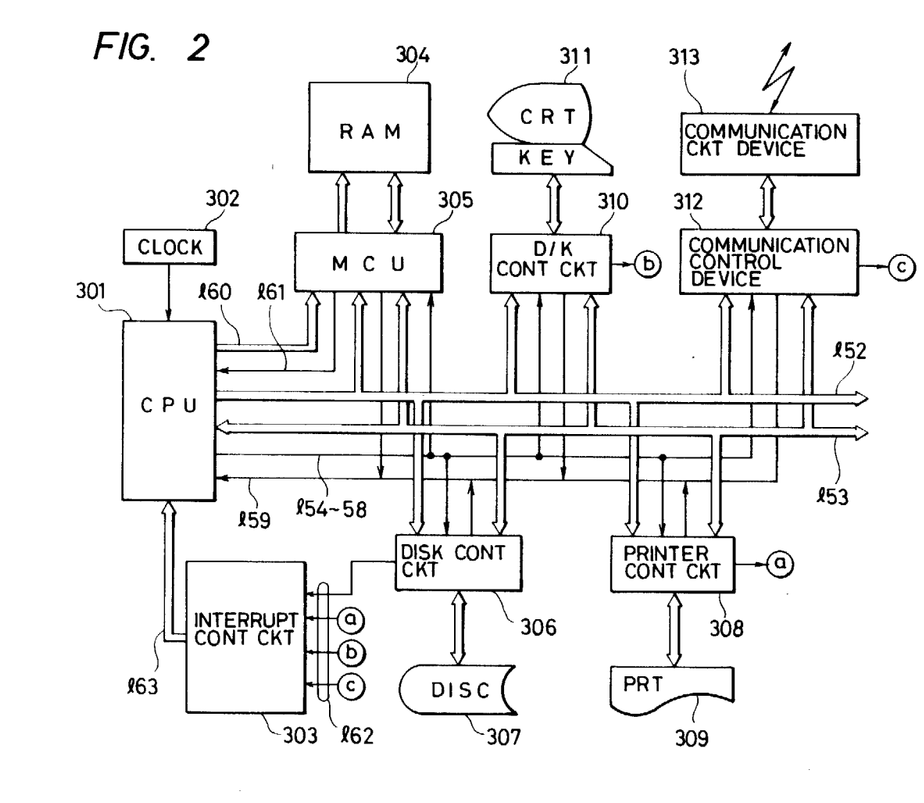
FIG. 2 is a block diagram showing schematically the system configuration when a virtual computer system is realized by a personal computer.

FIG. 2 shows an example of micro-computers in accordance with the present invention. In the drawing, reference numeral 301 represents a microprocessor (CPU); 302 is a clock generator (CLOCK); 303 is an interruption control circuit; and 304 is a main memory (RAM). RAM 304 stores therein a control program (VMM) 502, OS 506, user program 515 and the like shown in FIG. 1, and VMM 502 contains control data such as a control block.

Reference numeral 305 represents a memory control unit (MCU), 306 is a disk control circuit, 307 is a magnetic disk file (DISC), 308 is a printer control circuit, 309 is a printer (PRT), 310 is a display/keyboard (D/K) control circuit, 311 is a display (CRT) equipped with a keyboard (KEY), 312 is a communication control circuit, and 313 is a communication circuit device. Suitable peripheral circuits may be selected, whenever necessary, and those not shown in the drawing may also be used.

CPU 301 and each component are connected to each other by an address bus 152, a bidirectional data bus 153, control signal lines 154–158 for each portion and a response signal line 159 from each portion. Signal line 161 is used to report an error status, for example a memory error, from MCU 305 to CPU 301.

CPU 301 sends a desired memory address to the address bus 152, and sends also control data to the control signal line groups 154–158 and to a function line bus 160 so as to read out necessary one among VMM 502, OSs 506, 507, UP 515 and the like (FIG. 1) stored in RAM 304. CPU 301 receives the read-out data through the data bus (53. In the same way, it receives the control data of the control block (FIG. 3) or the like, whenever necessary. When an interruption request from units 306, 308, 310, 312 is sent to the interruption control circuit 303 through the signal line group 162, the control circuit 303 generates an interruption level number in accordance with the privileged order and sends the number to CPU 301 through the signal line group 163.

Figure 3:
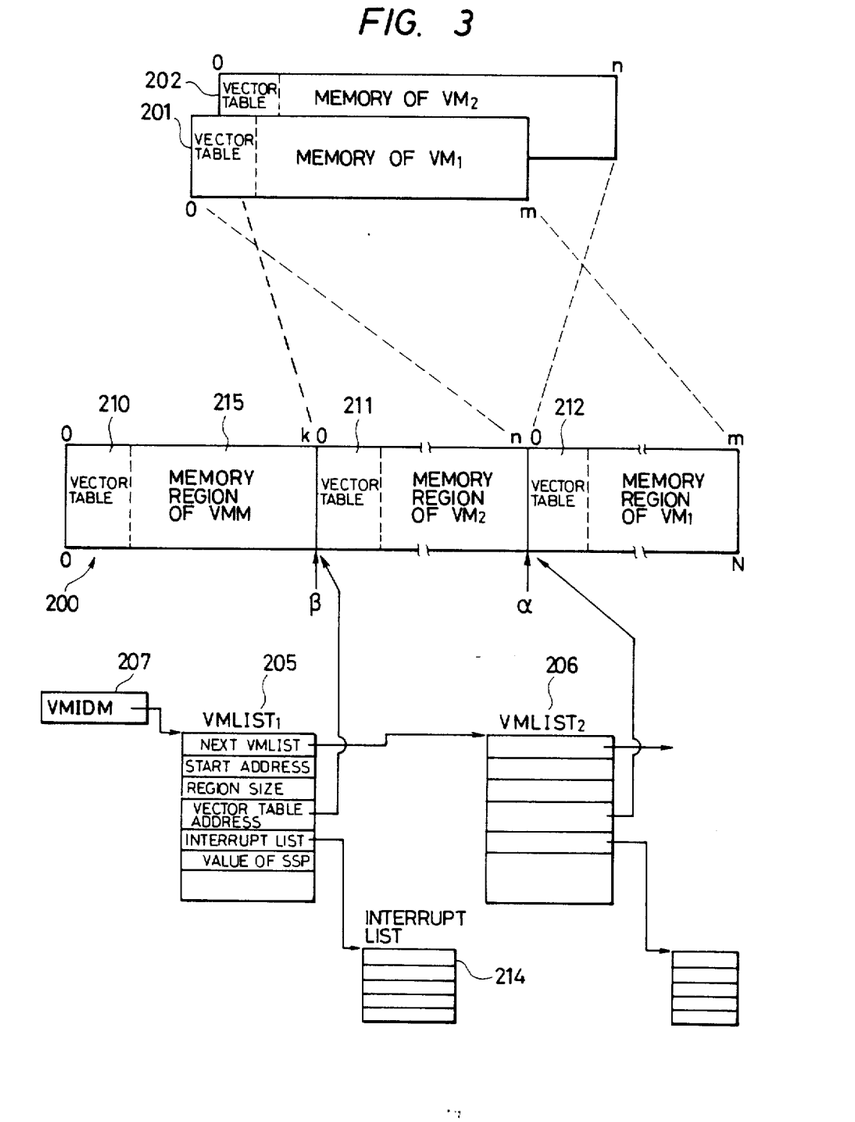
FIG. 3 is a block diagram showing the relation of correspondence when a main memory region (main memory) of each virtual machine is continuously allotted to the bare machine main memory.

FIG. 3 shows a bare machine main memory 200 (main memory) for the bare machine BM 501 and the control blocks that exist inside the main memory 200. It also shows the relation of correspondence between the virtual machine main memories 201, 202 for the group of virtual machines VMs 504, 505 and the bare machine main memory 200.

In other words, under the virtual computer system, the virtual machine main memory of each VM is made to correspond continuously with respect to a certain region inside the bare machine main memory 200.

Each VM uses a predetermined region from the start address as a vector table inside the region allotted continuously to each VM inside the main memory 200. For example, the main memory 201 of $VM_1$ is continuously allotted inside the bare machine main memory 200, the start address (represented by $a$ in the drawing) of that VM becomes the vector table 212 of that $VM_1$. The start address of this VM is pointed to from the control block $VMLIST_2$. The meaning of $VMLIST_1$ and $VMLIST_2$ will be described later.

VMM manages the allottment of the region of each VM.

The user program 515 and the operating system OS 506 in FIG. 1 operate while regarding the virtual machine main memories 201 as the bare machine main memory. Therefore, OS 506 and UP 515 need not at all recognize that they are operating under the virtual computer system. This is accomplished by a specific control program called a "virtual machine monitor" 502 (which will be hereinafter referred to as "VMM").

The virtual machine monitor VMM 502 prepares and manages control blocks VMLISTs 205, 206, etc. for VMs, respectively, in order to smoothly manage the operation of each VM.

The control blocks 205, 206, 207 exist in the memory region 215 of VMM inside the bare machine main memory 200. The processing program of VMM of its own also exists in the memory region 215 for VMM. The control block VMIDM 207 holds the existing address of the control block 205.

The interruption list 214 is a control block which holds the interruption suspension state when an interruption is generated from an external unit and is once accepted, but the corresponding VM is operating under the interruption inhibition state when the interruption is reported to the corresponding VM.

As can be seen clearly from FIG. 3, the control block 205 contains therein the start address of the memory region allotted to the corresponding VM inside the main memory 200 and the start address of the vector table 211 of that VM, and VMM refers to and updates the data in order to smoothly carry out the service processing of each VM.

Figure 4:
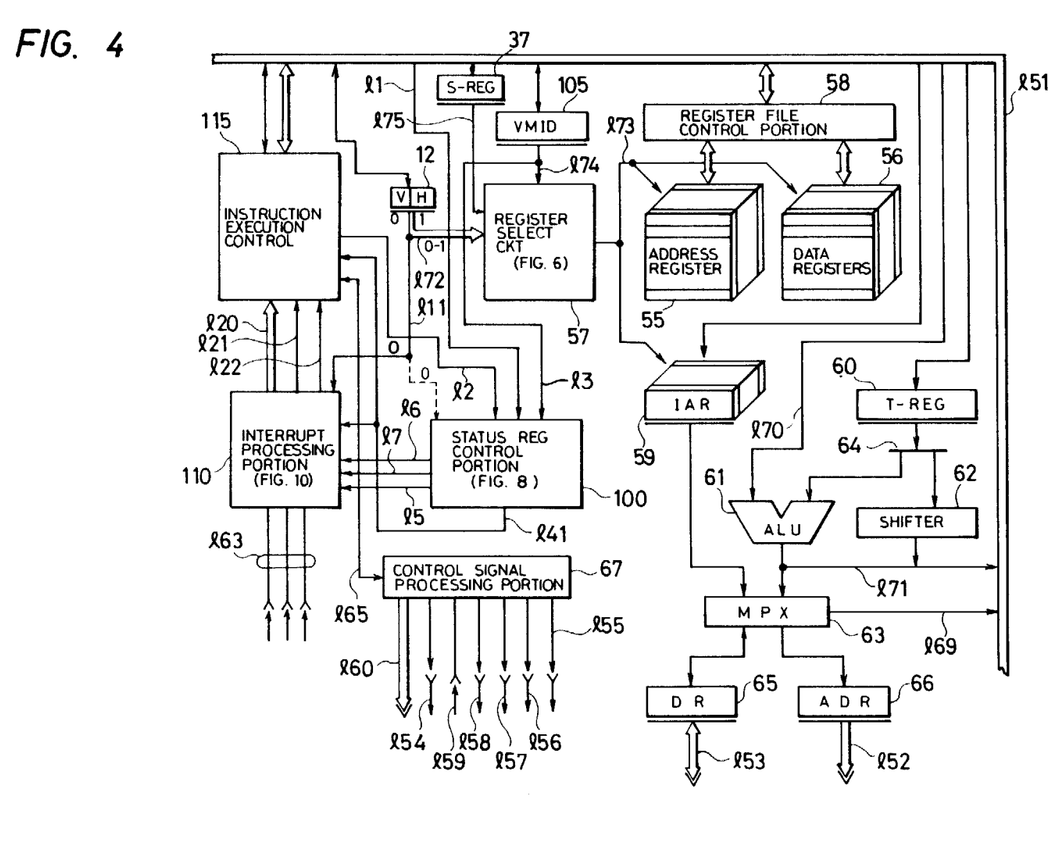
FIG. 4 is a block diagram showing a microprocessor typically representing the features of a control unit of the virtual computer system in accordance with the present invention.

FIG. 4 is a block diagram showing the construction of CPU 301 shown in FIG. 2 and illustrates typically the characterizing features of the present invention. In this drawing, reference numeral 55 represents an address register file consisting of a plurality of address register groups of the present invention, and reference numeral 56 represents a data register file consisting of a plurality of data register groups. The address registers and the data registers are shown as an example of operational registers, and general purpose register groups may be disposed in place of these address and data register groups.

Among the signal lines, symbols —>— and —<— represent signal lines to and from outside the CPU chip, respectively.

Reference numeral 59 represents a plurality of instruction address registers (hereinafter referred to as "IAR"). IAR is sometimes called a program counter. Reference numeral 55 represents an address register file consisting of a plurality of address counter groups, and reference numeral 56 represents a data register file consisting of a plurality of data register groups. Among these register files, one group of registers are allotted to each VM, and each IAR of the IAR groups is allotted to a respective VM. These register groups 55, 56 and 59 constitute the characterizing feature of the present invention. Reference numeral 57 represents a register selection circuit to determine which registers of register groups 55, 56 and 59 are to be selected and which IAR is to be selected. This selection circuit will be described later in further detail with reference to FIG. 6.

A register file control portion 58 selects the individual registers designated by the instruction from the address register group 55 and the data register groups 56 selected by the register selection circuit 57.

A status register control portion 100 constitutes another characterizing feature of the present invention, and its detail will be described elsewhere. In short, this status register control portion 100 has a status register file including a plurality of status registers, and each status register in the status register file is allotted to the virtual machine, VMM or one of a plurality of VMs and holds the status word for a corresponding computer. A VM identification register VMID 105 holds the identification number (VM number) of the VM that is under operation, and its content is utilized in the status register control portion 100 and the register selection circuit 57.

The mode register 12 represents the present operating mode and consists of 2 bits. The 0 bit is called a "V bit" and represents whether the present operating mode of the virtual machine is the operating mode (with the V bit being "1") or the operating mode of the bare machine is the operating mode (with the V bit being "0"). Even when the VMM is under operation, its mode is dealt with as the operating mode of the virtual machine.

Figure 7:
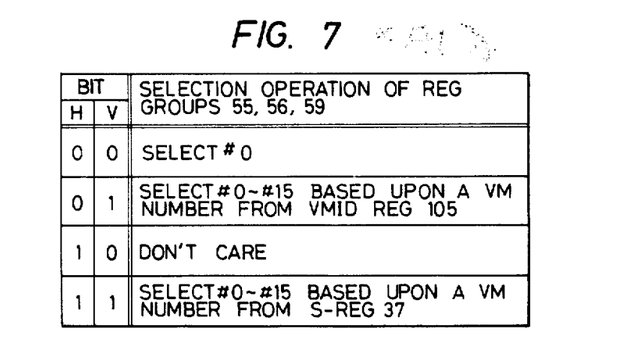
FIG. 7 is a diagram showing the relation of mode bits and register selection.

The first bit is called an "H bit" and represents a mode in which access is made to the register of the other VM during the operation of the VMM. It has a meaning, only during the operating mode of the virtual machine. When the H bit value is "0", there is no meaning, but when it is "1", it means that one of the address register group 55, the data register group 56 and a plurality of IARs 59 is selected by the number designated by S-REG 37. The relation between the V and H bit values of the mode register 12 and the operation will be explained later with reference to FIG. 7.

The V and H bit values of the mode register 12 are sent to the register selection circuit 57 through the line 172. The V bit value is sent to the status register control portion 100 and the interruption processing portion 110 through the line 111. Values are set to the mode register 12, VMID 105 and S-REG 37 in accordance with the instruction from the VMM.

The interruption processing portion 110 compares the interruption level signal given thereto through the single line group 163 with the interruption mask level value given from the status register control portion 100, and accepts the interruption when the former is greater than the latter.

The instruction execution control portion 115 sequentially takes out the program instructions stored in RAM 304 and governs the control for interpretation and execution. This control portion is known in the prior art.

In more detail, the instruction execution control portion 115 consists of an instruction register for holding the program instruction thus taken out, a decoder decoding the program instruction in the instruction register and generating various signals and a microprogram control unit executing and controlling the decoded program instruction and controlling the take-out of the next program instruction. The microprogram control unit changes over the program instruction to be executed next in response to the status word of the computer and the interruption signal, and so forth.

The control signal processing portion 67 transfers and receives various control signals and response signals between the processor 301 and external devices. A temporary holding register (T-Reg) 60, an arithmetic and logic unit (ALU) 61, a shift calculator 62, a multiplexor (MPX) 63, a selector 64, a data holding register (DR) 65, an address holding register (ADR) 66 and a register file control portion 58 are provided in order to process and transfer the data.

VMID 105 and the mode register 12 are set by the instruction generated by the processing program of the VMM 502 shown in FIG. 1, and when the processing program is operating in the region 215 inside the main memory 200, they are set when the instruction for setting the VM number to VMID 105 and the instruction for setting the value of the V bit of the mode register 12 to "1" are generated as the VMM executes service processing (which is referred to as "dispatch processing") of the VM 504.

When it is necessary for the VMM 502 to refer to the register values of VM 504 and VM 505, VMM 502 generates an instruction for setting the number of such a VM to S-REG 37 and an instruction for setting the V bit value of the mode register 12 to "1" and the H bit value to "1".

Hereinafter, the operations for sequentially executing the instructions will be described.

The instruction execution control portion 115 reads out an instruction to be next executed from RAM 304 (FIG. 2) on the basis of the memory address represented by IAR 59 that is selected by the register selection circuit 57, in the following manner. The content of the selected IAR 59 is held by ADR 66 through MPX 63, from thence sent to the address bus 152. At the same time, the control signal processing portion 67 receives the instruction from the instruction execution control portion 115 through the signal line 165, and delivers necessary control signals to the signal lines 154–158 and to 160.

Upon receiving these signals, MCU 305 reads out the instruction from the designated address of RAM 304, and sends it to the data bus 153 and simultaneously the response signal "1" to the signal line 159.

Upon receiving the response signal "1" on the signal line 159, the instruction execution control portion 115 takes the data on the data bus 153 into DR 65, from thence through MPX 63 and the internal data bus 151. The instruction consists of an operation field, a register field and an address field.

Figure 5:
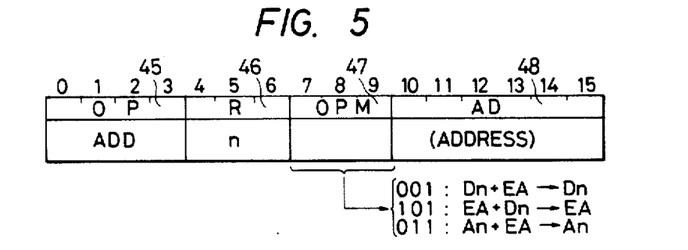
FIG. 5 is a format of instruction data used in the micro-processor shown in FIG. 4.

The instruction data is decoded in the instruction execution control portion 115. FIG. 5 shows an example of the format of the instruction word. In this drawing, the format at the time of the instruction involving the register operation designates the kind of operation (e.g., addition) in the OP field 45, the register number n in R (Register) field 46 and modification of operation (e.g., identification whether the register as the object of the operation is the data register 56 or the address register 55) in an OPM (Operation Mode) field 47, respectively.

In FIG. 5, symbol $D_n$ represents the data register and $A_n$ represents the address register. Symbol EA represents an effective address, and the AD (address) field 48 designates the memory address.

The instruction execution control portion 115 examines the OP field 45, distinguishes the kinds of instructions, and after making preparation for the execution of the instruction, calculates the effective memory address described above. It also updates IAR 59. The address calculation is made using ALU 61, and the final effective address is held by ADR 66.

Next, the instruction execution control portion 115 carries out calculation control. In the case of addition shown in FIG. 5, for example, it selects either one of the address register file 55 and the data register file 56 through the register file control portion 58, takes out the data of the corresponding register number and sets it into T-REG 60 through the internal bus (51. This data is from thence sent as one of the inputs to ALU 61 through the selector 64. Incidentally, it is hereby assumed that a specific register group of both the register files 55 and 56 is selected by the register selection circuit 57 as will be described elsewhere.

The data inside the memory address is read into DR 65 in the same way as the reading of the instruction data described already, by use of the effective address that has in advance been calculated and held in ADR 66, and is then applied as the other of the inputs to ALU 61 through MPX 63, line 169, data bus 151 and 170. As a result, ALU 61 executes the required calculation. When the result of calculation is put into the registers, it is stored in the register having the register number designated in either one of the address register file 55 and the data register file 56 through the signal lines 171 and 151. When the result of calculation is returned to the memory, it is temporarily stored in DR 65 through MPX63, is then sent to RAM 304 through the data bus 153 under control of the control signal processing portion 67 and is written into the address designated by ADR 66.

Next, the mechanism which selects the required register group and IAR from the address register file 55, the data register file 56 and the IAR group 59 will be explained. Since the number of the running VM is set in advance into VMID 105 by VMM 501, this selection is executed by the register selection circuit 57 in accordance with the VM identification number from VMID 105 and the mode bit from the mode register 12. In other words, the register selection circuit 57 generates a register group selection signal (73 on the basis of the data of the mode register 12 sent through VMID 105 and the line 172, and selects the specific group from a plurality of address register groups 55 and data register groups 56, and one IAR from the IAR group 59.

Figure 6:
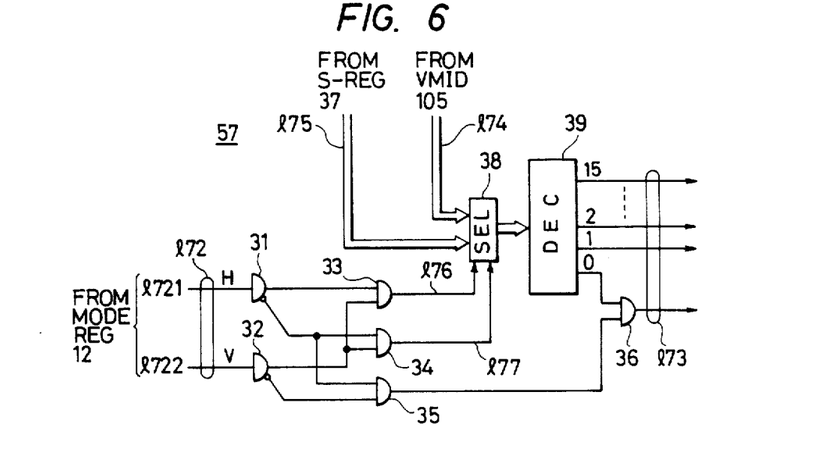
FIG. 6 is a circuit diagram of a register selection circuit, in the processor shown in FIG. 4.

FIG. 6 is a circuit diagram showing in detail the register selection circuit 57. In the drawing, reference numerals 31 and 32 represent inversion circuits, which produce positive signals and inversion signals. Reference numerals 33, 34 and 35 represent AND circuits (logical product circuits) and reference numeral 36 represents an OR circuit (logical OR circuit). Reference numeral 38 represents a selection circuit (SEL), and 39 is a decoder (DEC). Signal lines 1721 and 1722 illustrate clearly and individually the signal line group 172. Line 1721 represents the VMM operation mode signal (H bit), while line 1722 represents the VM mode signal (V bit).

The register selection circuit 57 executes the selecting operation in accordance with the H bit value and the V bit value described above as shown in FIG. 7. In more detail, if both of the H and V bit values are "0", the operation mode of the ordinary bare machine is indicated, and the selection circuit 57 selects the register group of No. 0 from the register file 55 and the register of No. 0 from the IAR group 59. When only the V bit is "1", it indicates the operation mode of the virtual machine, and the selection circuit selects the register group and IAR corresponding to the VM number given from VMID 105. When both the H and V bit values are "1", the selection circuit selects the register group and IAR designated by the VM number from S-REG 37.

This operation mode is used when the VMM wants to examine the status of each VM or when the VMM operates in place of the VM. The state in which the V bit is "0" and the H bit is "1" is not used in this embodiment. When the operations inherent to the VMM, such as the memory allottment processing inside the virtual computer system or input/output processing, are to be carried out, the VMM is also regarded as one of the VMs. The VM number of the VMM is set to 0 in order to cope with such a case. In this case, the operation mode is dealt with as the bare machine mode in the subsequent interruption processing.

The operation of the register selection circuit 57 will be described in further detail.

First of all, when both the H and V bits of the mode register 12 are "0", the inversion output signals from the circuits 31 and 32 give "1" to the 2-input of the AND circuit 35. Therefore, the output signal of the AND circuit 35 becomes "1", No. 0 of the register group selection signal 173 becomes "1" through the OR circuit 36 and eventually, the No. 0 register group and IAR are selected from the address register file 55, the data register file 56 and the IAR group 59.

When the H bit value of the mode register 12 is "0" and its V bit value is "1", the signal output from the AND circuit 34 through the signal line 177 becomes "1". At this time, the selection circuit 38 sends the VM number given from VMID 105 through the signal line group 174 to the decoder (DEC) 39. Therefore, any one of the signals of any one of the signal lines of the output signal line group 173 of DEC 39 becomes "1". The signal line group 173 consists of a signal line for the VMM and fifteen signal lines for the VM, i.e., Nos. 0 to 15. When any one of signal lines of the signal line group 173 becomes "1", one each address register, data register and IAR of the corresponding group to the selection signal line 173 generating the "1" output, from the address register file 55, the data register file 56 and the IAR group 59, each consisting of a plurality of registers as shown in FIG. 4. When the value of VMID 105 is "0", that is, in the case of the VM number being allotted to the VMM, No. 0 of the signal line 173 becomes "0" through the OR circuit 36, and this state is equal to the case where both of the V and H bits are "0", that is, the bare machine mode.

When both of the H and V bits of the mode register 12 are "1", the signals of the signal line 1721 and 1722 become "1", and the signal output from the AND circuit 33 through the signal line 176 becomes "1". At this time, the selection circuit 38 sends to the decoder DEC 39 the VM number that is sent from S-REG 37 through the line 175. Therefore, the VMM can make access to the operation register group and IAR allotted to a given VM by setting the number of that VM to be referred to, to S-REG 37.

As can be understood clearly from the description given above, the present invention eliminates the necessity of the slave/restore processing of the content of the data register group, the address register group or the instruction registers even when VMs are changed over, and the changeover operation can be therefore speeded up.

The sequence of execution of general, so-called "non-privileged" instructions is as described above. In contrast, the instruction of updating of or reference to the status registers belonging to the privileged instruction group operates the status register control portion 100 shown in FIG. 4.

Figure 8:
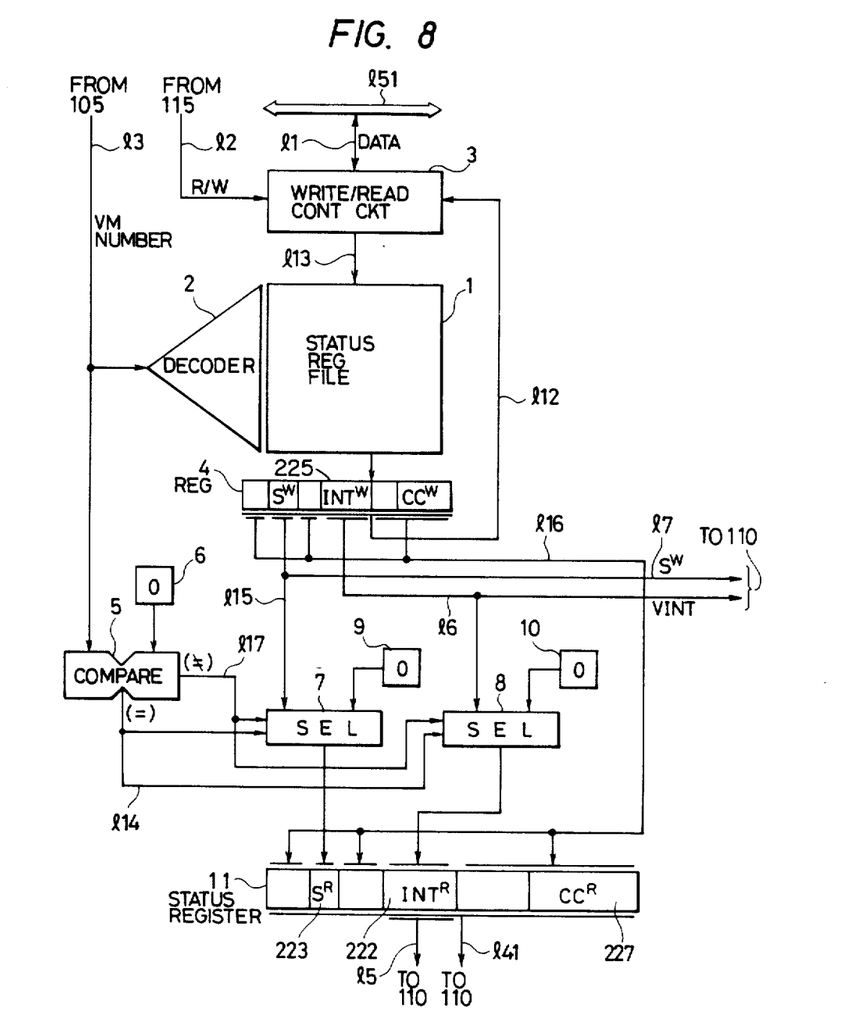
FIG. 8 is a block diagram showing in detail the status register control unit of FIG. 4.

FIG. 8 shows in detail the status register control portion 100. The status register file 1 has a group of status registers and consists of flip-flops or high-speed small capacity memories equivalent to flip-flops that are allotted to the VMM and each VM, respectively. Each status register holds the status word corresponding to the bare machine, VMM and VM.

Ordinarily, the status word represents the operation state of the bare machine, VMM or VM that is under operation, and holds a flag bit representing whether or not the operation mode is the supervisor mode, the interruption mask level number for judging whether or not the processor is under the state in which it accepts the external interruption, and the conditional code (CC) field for the result of calculation. When the processor CPU 301 is operating in the environment of the VMS, the prior art system generates the status word described above for each VM in the control program block 205 shown in FIG. 3. Therefore, the content of the status word is updated or referred to by a running VM, or more definitely when an instruction for changing the interruption mask level value is generated, simulation processing is executed so that the VMM searches the control block 205 corresponding to that VM and the value is stored in the corresponding field of the control block. This proves to be the simulation overhead of the VMM. In contrast, in accordance with the present invention, a status register is provided so as to correspond to each VM as shown in FIG. 8, and these status registers are put together as the status register file 1. According to this arrangement, when the instruction for changing the content of the status word or the instruction for referring to the status word is generated from the running VM described above, the VMM executes such an instruction without executing the simulation processing, thereby reducing the overhead of the VMM.

In short, the status register control portion 100 selects a status register that corresponds to the running VM from the status register file 1, in accordance with the VM number from VMID 105, sends the content to the internal data bus through the operation register in accordance with the reference instruction or updates the content by the updating data from the internal data bus (51 in accordance with the updating instruction, and reflects the result on the status register 11. Here, symbols $S^W$, $INT^W$ and $CC^W$ in the operation register represent the supervisor mode, the interruption level number and the condition code of one status word read out from the status register file 1, respectively.

When the VM is newly executed, the status word for that VM, that is read out from the status register file 1, is set to the operation register 4 and at the same time, transferred to the common status register 11. However, both of the supervisor mode bit ($S^R$) 223 and the interruption mask level ($INT^R$) 222 of the status register 11 are forcedly reset to "0". This is for the following purpose. First, the supervisor mode bit ($S^R$) 223 is reset to "0" so that all the interruptions can be accepted by CPU 301. Next, the interruption mask level number INTR 222 is reset to "0" so that the interruption from any external units can be accepted. Condition code $CC^W$ 226 is transferred to status register 11 as a real condition code $CC^R$ 227.

In other words, when the virtual computer system is under operation, a plurality of VMs are operating apparently simultaneously. When the status word of the status register of the running VM is set to the common status register 11 for operation, and if the value of $INT^R$ 222 is high, an external interruption smaller than the $INT^R$ value cannot be accepted, with the result being the reduction of the processing capacity of the system as a whole. To prevent such a problem, the above-mentioned arrangement which can accept all the interruptions is employed, and a circuit is disposed which thereafter judges whether or The decoder 2 decodes the VM number sent from VMID 105 through the signal line 13, and selects a corresponding status register. The write/read control circuit 3 performs the write/read control for the status register file 1 in response to the reference/updating instruction signal on the signal line 12, and exchanges the data between it and the internal data bus 151 through the signal line 11. The content of the status register read out from the status register file 1 is held by the operation register.

The comparator 5 judges whether or not the VM number on the signal line 13 is equal to the output of the 0 value generator 6. The selectors 7 and 8 are changed over by the output of the comparator 5, and selects and sends the output of the 0 value generators 9 and 10 or either one of the supervisor mode bit ($S^W$) and the interruption mask level ($INT^W$) of the register 4. The combination of the content of the other fields of the register 4 with the outputs of both of the selectors described above becomes an input to the common status register 11.

In this embodiment, both VMM and bare machine are expressed by the VM number "0". Here, the reason why the common status register 11 exists besides REG 4 is to distinguish $INT^W$ 225 and $INT^R$ 222 and to execute the conventional operations when the operation mode is in the bare machine mode.

The operations are as follows. The VM number sent from VMID 105 through the signal line 13 is applied to both the decoder 2 and the comparator 5. The decoder 2 decodes this VM number and selects the corresponding status register in the status register file 1. If the signal on the signal line 12 is "0" at this time, the reference operation is instructed. The write/read control circuit 3 reads out the content of the selected status register in response thereto for the operation register 4, receives the content through the signal line 112 and sends it to the internal data bus 151 through the signal line 11.

On the other hand, if the signal on the signal line 12 is "1", the updating data is given to the signal line 11. The write/read control circuit 3 writes this updating data into the selected status register through the signal line 113, and then reads out the updated content to the operation register 4. Next, the operation which reflects the content of the operation register 4 on the common status register 11 is effected, and this reflecting operation is divided into the following two groups depending on the VM number on the signal line 13.

(1) If the VM number is "0", that is, if VMM is under operation or the processor is in the bare machine mode, the content of the operation register 4, that is, the content of the updated status register, is as such set to the common status register 11.

(2) If the VM number is not "0", that is, when a certain VM is operating, the interruption mask ($INT^R$) 222 and the supervisor mode bit ($S^R$) of the common status register 11 are both reset compulsively to "0", and the content of the register 4 is transferred only to the other fields.

More specifically, in the case of (1), the VM number is "0" and hence the comparator 5 detects coincidence and sends "1" to the signal line 114. In response to this, it selects the signal on the signal line 115, that is, the supervisor mode bit ($S^W$) of the register 4, and sets it to the corresponding field 223 of the bare status register 11. Similarly, the selector 8 selects the signal on the signal line 16, that is, the interruption mask level ($INT^W$) of the register 4, and sets it to the corresponding field 222 of the bare status register 11. The content of the other fields of the operation register 4 is as such transferred to the corresponding fields of the common status register 11 through the signal line 116.

In the case of (2), on the other hand, the VM number on the signal line 13 is not "0". Therefore, the comparator 5 detects discordance and sends "1" to the signal line 117. In response thereto, the selectors 7 and 8 select the outputs of the 0 value generators 9 and 10, respectively, and set them to the supervisor mode bit field 223 and interruption mask level field 222 of the common status register 11. The contents of the corresponding fields of the register 4 are transferred to the other fields of the common status register through the signal line 116. After all, the supervisor mode bit $S^R$ and the interruption mask level $INT^R$ are forced to "0", and the other portions coincide with the content of the status words of VM after updating.

All the contents of the common status register 11 are transferred to the instruction execution control portion 115 through the signal line 141, and the interruption mask level ($INT^R$) 222 is sent to the interruption processing portion 110 through the signal line 15.

The interruption mask level $INT^W$ in the operation register 4, that is, the interruption mask level of the running VM, is sent to the interruption processing portion 110 through the signal line 16.

Figure 9:
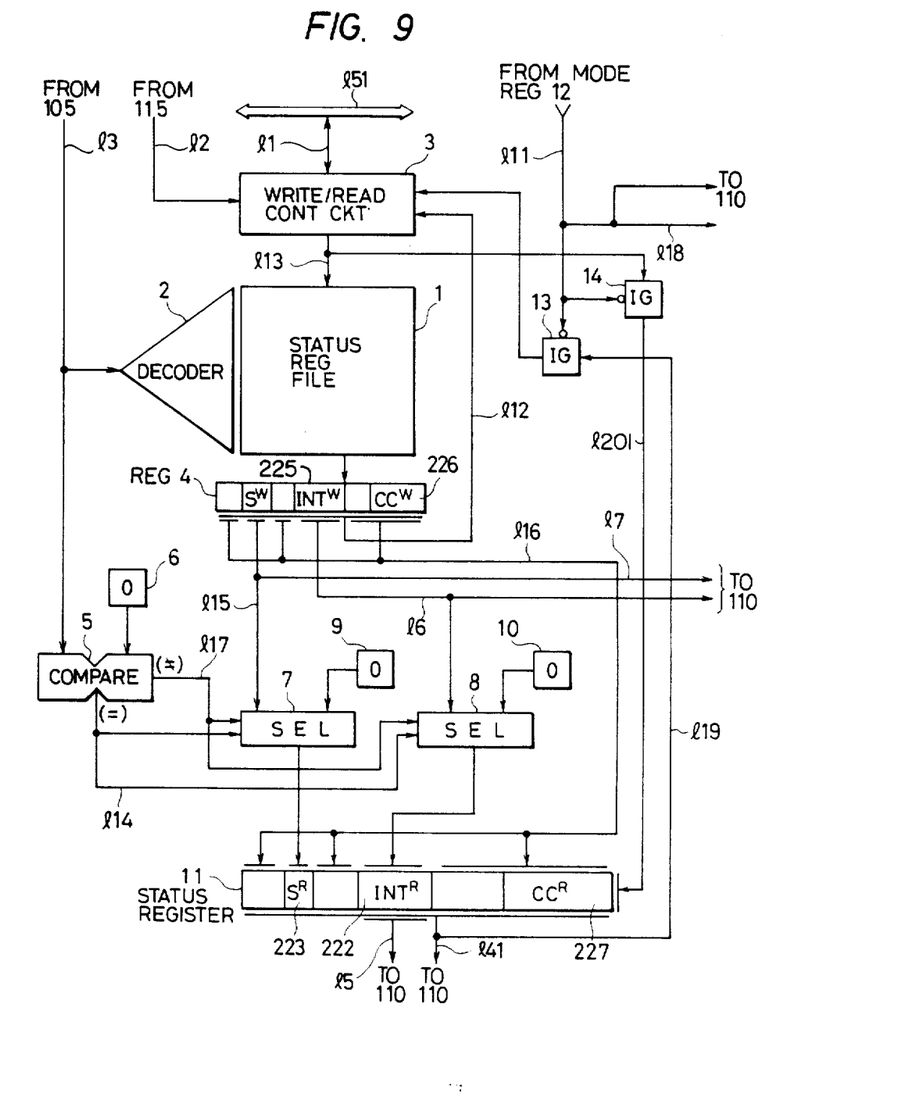
FIG. 9 is a block diagram showing another example of FIG. 8.

FIG. 9 shows a modified example of the status register control portion 100 shown in FIG. 8. In the drawing, like reference numerals are used to identify like constituents as in FIGS. 4 and 8. In this embodiment, VMM has the VM number "0" and receives the allottment of the status register in the status register file 1. In the bare machine mode, however, direct access is made to the common status register 11. For this purpose inhibition gates (IGs) 13 and 14 are disposed which are controlled by the V bit output of the mode register 2 shown in FIG. 4 between the write/read control circuit 3 and the common status register 11, and this construction is different from the embodiment shown in FIG. 8.

In the bare machine mode, the V bit of the mode register 12 is "0", and this turns ON the inhibition gates 13, 14 and is sent to each portion through the signal line 118, thereby inhibiting the access to the status register file 1 and the data transfer from the operation register 4 to the common status register 11. In the reference operation, the content of the common status register 11 passes through the signal line 119 and then through the inhibition gate 13 and is read out to the write/read control circuit 3. In the updating operation, the updating data from the internal data bus (51 is directly written into the common status register 11 from the write/read control circuit 3 through the signal line 113, the inhibition gate 14 and the signal line 1201.

During the operation of the VMM or VM, the V bit of the mode register 12 is "1". Therefore, the inhibition gates 13 and 14 are turned off, and the inhibition signal on the signal line 118 disappears. As a result, the circuit becomes equivalent to the circuit shown in FIG. 8, and the reference and updating operations of the status register file 1 corresponding to the VM number and the common status register 11 are effected in the same way as in the circuit shown in FIG. 8.

In the circuits shown in FIGS. 8 and 9, only the supervisor mode bit ($S^W$) and the interruption mask ($INT^W$) are handled in a specific manner when the reflecting operation to the common status register 11 is made. As to other fields, too, the same handling can be made depending upon the functions allotted thereto (e.g., designation of a hypervisor mode as a more privileged mode to the supervisor mode). Condition code $CC^W$ 226 in register 4 is transferred to status register 11 as a real condition code $CC^R$ 227.

Next, the construction and operation of the interruption control portion of the virtual computer system controller of the present invention will be described.

In accordance with the prior art system, when an interruption from an external unit is reported, control is temporarily shifted to the VMM. In other words, $INT^R$ 222 shown in FIGS. 8 and 9 is "0" and all the interruptions can be accepted. Therefore, the VMM searches the control blocks 205, 206 of VM that exist in the memory region of the VMM shown in FIG. 3, and compares the interruption mask level number of that VM with the interruption number from the external unit from the corresponding storage region of the status register of the VM corresponding to the interruption. If that VM is found to be able to accept the interruption as a result of comparison, a processing which reports the interruption to that VM is executed. When the VM is not able to accept the interruption, the interruption suspension data is stored in the interruption list 214. These processings are executed by the VMM and remain as the overhead.

In contrast, the present invention is equipped with a circuit for reducing the processing overhead of the VMM. More definitely, the status of a running VM can be directly examined by the control circuit shown in FIG. 10.

With reference to FIG. 4, the interruption mask level $INT^R$ value is applied from the status register control portion 100 to the interruption control portion 110 through the signal line 15. Similarly, the interruption mask level $INT^W$ in the status word corresponding to the running VM, the supervisor mode bit $S^W$ of the running VM in the instruction register 4 from one of the signal line group 141 through the $S^R$ bit signal line and the signal line 17, and the external interruption number from the external circuit are applied to the interruption control portion 110 through the signal line 16 and through the signal line 163, respectively.

The interruption control portion 110 sets the interruption number to the signal line 120 and the interruption start signal to the signal line 21, respectively, on the basis of the group of the input signals described above if the external interruption can be accepted by the microprocessor CPU, and sends the signals to the instruction execution control portion 115.

Figure 10:
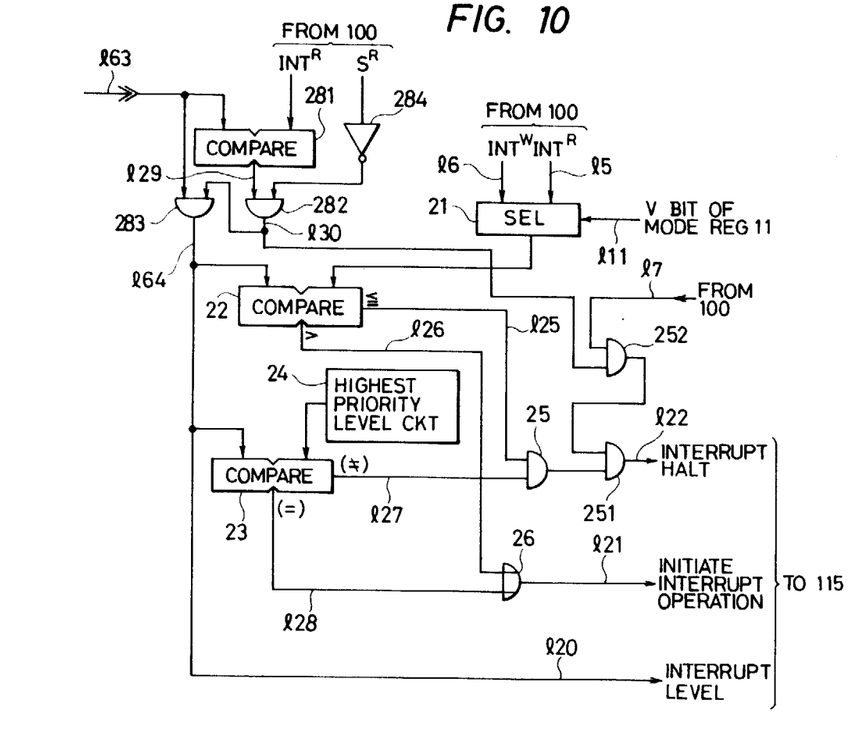
FIG. 10 is a diagram showing in detail the interruption processing unit shown in FIG. 4.

FIG. 10 shows in more detail the interruption control portion 110 shown in FIG. 4. In the drawing, reference numeral 21 represents a selector (SEL), and reference numerals 22, 23 and 281 represent comparators. Reference numeral 24 represents the highest priority value generator, which generates a value 7 in this embodiment. Reference numerals 25, 252 and 282 represent AND circuits, 26 and 251 are OR circuits and 283 is a gate circuit. Reference numeral 284 represents an inversion circuit.

The status register control portion 100 shown in FIG. 4 sends to the interruption control portion 10 the value of the interruption mask level $INT^R$ inside the common status control register 11 through the signal line 15, the value of the interruption mask level $INT^W$ inside the register 4 described above through the signal line 16, the $S^W$ value through the signal line 17, the value of the supervisor mode bit $S^R$ of the common status register 11 through one of the signal line group 141 and the virtual machine operation mode bit V representing the present operating status of the micro-processor from the mode register 11 through the signal line 111.

When the value of the V bit is "0" (that is, when the value of the signal line 141 is "0"), it represents the operating state of the bare machine and when it is "1", it represents the operating state of the virtual machine. Incidentally, the value of the V bit is also 0 when the VMM is under operation.

First of all, the value of the interruption level signal from the external device becomes one of the inputs to the comparator 281 through the line 163. The interruption mask level $INT^R$ of the common status register 11 shown in FIGS. 8 and 9 becomes the other input and is compared with the former. If the value of the interruption mask level signal is found to be greater than $INT^R$ as a result of comparison, the value of the signal lines 129 and 130 become "1". The value of the supervisor mode bit $S^R$ in the common status register 11 shown in FIG. 8 is inverted by the inversion circuit 284 and becomes the input to the AND circuit 282. The value of the signal line 130 is set to "1" by the comparator 281 and the AND circuit 282 only when the interruption from the external device is not in the supervisor mode ($S^R=0$) and when the interruption level value is greater than the interruption mask level ($INT^R$), and is received as the gate circuit 283 opens. As described already, however, all the interruptions from the external devices can be accepted because both the values $INT^R$ and $S^R$ are forced to "0" in the virtual machine operation mode.

Next, the selector 21 selects the value on the signal line 15, that is, the value of $INT^R$, when the value of the V bit on the line 111 is "0", and applies it as one of the inputs to the comparator 22. On the other hand, when the value of the V bit is "1", the selector selects the value of $INT^W$ on the signal line 16, that is, the value of $INT^W$, and applies it as one of the inputs to the comparator 22.

The value of the interruption signal at the time of occurrence of the cause for interruption is applied to the other input terminal of the comparator 22 through the gate circuit 283 and the signal line 164. The value of the signal line 164 is applied also to the comparator 23 and the gate circuit 27. The signal line 164 is supplied from outside the LSI chip.

The comparator 22 compares the interruption number at the time of the occurrence of the cause of interruption with the value of the interruption mask level. If the value of the interruption signal at the time of the occurrence of the cause for interruption is found to be smaller than the value of the interruption mask level as a result of comparison, the value of the signal line 125 is set to "1" and becomes one of the inputs to the AND circuit 25. If the value of the interruption number is found to be greater than the interruption mask level, it means that the interruption operation start condition is established. Therefore, the value of the signal line 126 is set to "1", and this value reports the interruption start to the instruction execution control portion 115 shown in FIG. 4 through the OR circuit 26 and the signal line 121. At this time, the interruption number is sent to the instruction execution control portion 115 through the signal line 120.

The operation of the comparator 23 is effected in parallel with that of the comparator 22. The comparator 23 checks whether or not the interruption number at the time of the occurrence of the cause for interruption, that is sent through the signal line 164, is the most privileged interruption. The term "the most privileged interruption" means that the interruption occurs irrespective of the value of the interruption mask level in the status word. Since the signal line group 163 consists of three lines in this embodiment, the most privileged interruption occurs when the value of the interruption number is 7. Therefore, the most privileged sequence value generation circuit 24 generates the value 7. This value is changeable.

When the value of the interruption number is found not to coincide with the value of the most privileged sequence as a result of comparison by the comparator 23, the value of the signal line 127 becomes "1" and is one of the inputs to the AND circuit 25. The signal representing the result of comparison by the comparator 22, which is described above, is applied to the other input of the AND circuit 25, and the value of the line 127 is "1" when the interruption number is below the interruption mask level. Therefore, the output signal of the AND circuit 25 is the interruption suspension signal and makes report to the instruction execution control portion 115 through the OR circuit 251 and the signal line 122. If the value of the supervisor mode bit $S^W$ of the running VM is "1", the logical product is obtained by the AND circuit 252, and the interruption suspension signal is also produced through the OR circuit 252.

When the interruption number is found to coincide with the most privileged sequence value as a result of comparison by the comparator 23, the interruption operation is compulsively started. This is reported to the instruction execution control portion 115 first through the OR circuit 26 via the signal line 128 and then through the signal line 121.

Quite naturally, the interruption number, too, is sent through the signal line (20 in the same way as described above.

Upon receiving the interruption start instruction through the signal lines 120–121, the instruction control portion 115 shown in FIG. 4 calculates an entry address corresponding to the interruption number given from the vector table of the running VM, and executes the next instruction of the address value of the vector table entry. Generally, the start address value of the interruption processing program is set to the vector table entry, and the interruption processing is carried out by sequentially executing this instruction group. For details of the interruption processing, refer to the afore-mentioned prior art references.

The report to the micro-program control device (called "micro-program break-in") in the instruction execution control portion 115 is made by the signal of the line 121. When this signal is received, the interruption operation described above is effected. The sequence of this operation, which is described in the afore-mentioned prior art references, is hereby detected. When the signal of the signal line 122 becomes "1" simultaneously with the change of the signal of the signal line 121 to "1", the interruption operation is executed by use of the vector table 10 of VMM shown in FIG. 3. Therefore, the VMM searches at this time the control block 205 of that VM, and executes the interruption processing program consisting of the processing instruction group storing the interruption data in the interruption list 214. This is necessary in order for VMM to report the interruption operation to that VM and to once store the interruption data when the running VM changes from the supervisor mode ($S^W=1$) to the nonsupervisor mode ($S^W=0$).

As described above, there is provided the means for automatically comparing and checking the value $INT^W$ of the interruption mask level of the status register of the running VM when the external interruption occurs. This means eliminates the necessity of intervention by the VMM and hence, can reduce the running overheads of the VMM.

In accordance with the present invention, the operational registers such as the address registers and the data registers and the instruction address registers are allotted to each VM, and access to the VM can be made immediately by use of the VM identification data. Therefore, the slave/restore processing of the contents of these registers becomes unnecessary not only when the operating mode of the VM and that of the VMM are changed over between them but also when the VMM executes the change-over processing of the running VMs (dispatch processing). As a result, the overheads can be drastically reduced because the intervention by the VMM is not necessary. Furthermore, since the VMM can make access to the registers allotted to an arbitrary VM, the overhead reducing effect described above can be further reduced.

Since the instruction for making reference to, or for updating, the status register can be directly processed by hardware, the overhead due to the simulation processing can be eliminated, and the overheads relating to the dispatch processing or to the handling of the status registers in the interruption processing can also be eliminated. Such reduction of the overheads makes it easy to apply the VMS particularly to extremely compact computers such as microprocessors.

As to the external interruption processing, hardware means is provided which directly compares the external interruption level with the value of the interruption mask level in the status word corresponding to the running VM. As a result, it becomes possible to reduce the overhead of the simulation processing due to the intervention of the VMM which is effected whenever the external interruption occurs, and the processing performance of the virtual computer system can be improved.

What is claimed is:

1. In a virtual computer system for selectively running a plurality of operating system programs under control of a virtual machine monitor program and having a main storage for storing said operating system programs and said virtual machine monitor program, the improvement comprising:
   an operating unit;
   identification means for holding an identification signal indicating one of the programs from among the operating system programs and the virtual machine monitor program stored in said main storage;
   a plurality of groups of operand registers connected to said main storage and said operation unit, each group being provided for a respective one of the virtual machine monitor program and the operating system programs and each operand register holding an address or data signal provided from or to be provided to said main storage or said operation unit;
   selection means connected to each of said groups of operand registers and to said identification means for holding one group of operand registers corresponding to a program designated by said identification signal in an accessible state; and
   instruction execution means connected to said main storage, said operation unit and each of said groups of operand registers for executing instructions of a running program from among the virtual machine monitor program and the operating system programs, including means responsive to an instruction requiring access to an operand register for accessing an operand register within said one group of operand registers held in an accessible state by said selection means.

2. A virtual computer system according to claim 1, wherein each group of operand registers comprises a group of address registers and a group of data registers.

3. A virtual computer system according to claim 1, wherein said identification means includes:
   a first identification register connected to said selection means for holding a first identification signal indicating a running program from among the virtual machine monitor program and the operating system programs;
   a second identification register connected to said selection means for holding a second identification signal indicating another program other than the running program from among the virtual machine monitor program and the operating system programs; and
   means connected to said selection means for indicating to said selection means which one of the first or second signals said selection means should respond to.

4. In a virtual computer system for selectively running a plurality of operating system programs under control of a virtual machine monitor program and having a main storage for storing said operating system programs and said virtual machine monitor program, the improvement comprising:
   an operation unit;
   at least one group of operand registers connected to said operation unit and said main storage each for holding address or data signals provided from, or to be provided to, said main storage or said operation unit;
   a group of instruction address registers each provided for a respective one of the programs, including the virtual machine monitor program and the operating system programs;
   a first identification register for holding an identification signal indicating a running program from among the operating system programs and the virtual machine monitor program;
   selection means connected to said group of instruction address registers and said first identification register for holding an instruction address register corresponding to the running program in an accessible state;
   instruction execution means connected to said main storage, said operation unit and said group of instruction address registers for executing instructions of the running program, including means for repeatedly renewing contents of said one instruction address register held in an accessible state by said selection means and for fetching an instruction of the running program from said main storage based upon the renewed contents of said one instruction address register.

5. A virtual computer system according to claim 4, further comprising:
   a second identification register connected to said selection means for holding a second identification signal indicating another program other than the running program; and
   means connected to said selection means for indicating to said selection means which one of the first or second identification signals to which said selection means should respond to;
   wherein said instruction execution means further includes means responsive to a request for accessing an instruction address register by a fetched instruction for accessing another instruction address register held in an accessible state corresponding to another program to read or rewrite the contents of said another instruction address register.

6. In a virtual computer system for selectively running a plurality of operating system programs under control of a virtual machine monitor program and having a main storage for storing said operating system programs and said virtual machine monitor program, the improvement comprising:
   an operation unit;
   instruction execution means connected to said main storage and said operation unit for executing instructions of a running program from among the operating system programs and the virtual machine monitor program;
   a group of status registers, each status register being provided for a respective one of the operating system programs and the virtual machine monitor program and each for holding an interrupt mask signal;
   an identification register for holding an identification signal designating a program from among the virtual machine monitor program and the operating system programs;
   selection means connected to said group of status registers and said identification register for holding one status register corresponding to a program designated by said identification signal in an accessible state; and
   access means connected to said group of status registers and said instruction execution means, and responsive to said instruction execution means executing an instruction requiring access to a status register, for reading or rewriting an interrupt mask signal in said one status register held in an accessible state by said selection means.

7. A virtual computer system according to claim 6, further comprising:
   interrupt processing means connected to said group of status registers and said instruction execution means for detecting whether or not an interrupt processing is to be initiated by said instruction execution means in response to an interrupt signal applied to said interrupt processing means, based upon an interrupt mask signal read out from said group of status registers.

8. A virtual computer system according to claim 7, wherein said interrupt processing means includes:
   gate means connected to said group of status registers for generating an interrupt mask signal which is equal to an interrupt mask signal read out from said status register for the virtual machine monitor program when the virtual machine monitor program is running and which is an interrupt mask signal which allows the interrupt processing to be started when the running program is one of the operating system programs;
   compare means connected to said instruction execution means and said gate means and responsive to an interrupt signal applied to said interrupt processing means for first comparing the interrupt signal with the generated interrupt mask signal to control said instruction execution means so as to produce a detection result indicating whether or not an interrupt processing is to be initiated by the instruction execution means under control of the virtual machine monitor when the detection result is affirmative and for thereafter comparing the applied interrupt signal with an interrupt mask signal for the virtual machine monitor program or one of the operating system programs to which the interrupt signal is provided, so as to finally detect whether or not an interrupt processing is to be initiated.

9. A virtual computer system according to claim 6, further comprising:
   a first status register for holding an interrupt mask signal read out from one of said status registers;
   mask means connected to said identification register and said group of status registers and responsive to a designation of one of the operating system programs by the identification signal for generating a first interrupt mask signal which allows execution of interrupt processing and responsive to a designation of the virtual machine monitor program by the identification signal for passing through a second interrupt mask signal read out of one of said status registers for the virtual machine monitor program;
   a second status register connected to said mask means for holding the first or second interrupt mask signal;
   compare means connected to said first and second status register and responsive to an interrupt signal for first comparing the interrupt signal with the first or second interrupt mask signal held by said second register and for thereafter comparing the interrupt signal with an interrupt mask signal read out during the interrupt processing from one of the status registers and held by said first status register.

10. In a virtual computer system for selectively running a plurality of operating system programs under control of a virtual machine monitor program and having a main storage for storing said operating system programs and said virtual machine monitor program, the improvement comprising:
   an operation unit; identification signal designating a program running on said system from among the virtual machine monitor program and the operating system programs;
   a group of instruction address registers connected to said main storage, each instruction address register being provided for a corresponding one of the virtual machine monitor program and the operating system programs, each for holding an address of an instruction to be fetched from said main storage;

a plurality of groups of operand registers connected to said main storage and said operation unit, each group of operand registers being provided for a respective one of said virtual machine monitor program and operating system programs and each operand register holding an address or data signal provided from, or to be provided to, said main storage or said operation unit;

selection means connected to said first identification register, said group of instruction address registers and said plurality of groups of operand registers for holding one of said instruction address registers and one group of operand registers both corresponding to said running program designated by the first identification signal in an accessible state; and instruction execution means connected to said first identification register, said group of instruction address registers, said groups of operand registers, said main storage and said operation unit for executing instructions of the running program, said instruction execution means including first means for repeatedly renewing contents of said one instruction address register held in an accessible state by said selection means and for fetching from said main storage an instruction of the running program based upon said renewed contents and second means for accessing an operand register within said one group of operand registers held in an accessible state, when the fetched instruction required access to one of said operand registers.

11. A virtual computer system according to claim 10, wherein each group of operand registers includes a group of address registers and a group of data registers.

12. A virtual computer system according to claim 11, wherein said virtual computer system is a personal computer.

13. A virtual computer system according to claim 10, further comprising:
a second identification register connected to said selection means for holding a second identification signal designating one of the operating system programs, the second identification signal being designated by an instruction included in the virtual machine monitor program;
a mode register connected to said selection means for selectively indicating first and second modes of operation to said selection means so that said selection means responds to the first and second identification signals during the first and second modes of operation, respectively, thereby enabling the virtual machine monitor program to access said instruction address register or one of said operand registers both provided for said one operating system program designated by the second identification signal, during execution of the virtual machine monitor program.

14. A virtual computer system according to claim 10, further comprising:
a group of status registers each register being provided for a respective one of the virtual machine monitor programs and the operating system programs, each status register holding an interrupt mask signal for a corresponding program; and
access means connected to said first identification register and responsive to an instruction in a running program for reading or rewriting an interrupt mask signal in one of said status registers corresponding to said running program designated by the first identification signal.

15. A virtual computer system according to claim 14, further comprising:
gate means connected to said first identification register and said group of status registers and responsive to designation of one of the operating system programs by the first identification signal for changing a first interrupt mask signal read out from said group of status registers by said access means to a second interrupt mask signal which allows interruption; and
interrupt processing means connected to said group of status registers and said gate means for processing an interrupt applied to said interrupt processing means based upon the first and second interrupt mask signals.

16. A virtual computer system according to claim 15, wherein said gate means further includes means connected to said first identification register and said group of status registers and responsive to designation of a virtual machine monitor program by the first identification signal for passing through the first interrupt mask signal;
wherein said virtual computer system further includes:
a mode register connected to said selection means for selectively indicating first and second modes of operation;
selection means connected to said mode register, said group of status registers and said gate means for selecting the first interrupt signal read out by said access means and either the second or first interrupt mask signal provided by said gate means in response to the first and second modes, respectively.

* * * * *